United States Patent [19]

Kassai

[11] Patent Number: 4,732,406
[45] Date of Patent: Mar. 22, 1988

[54] PUSHCART
[75] Inventor: Kenzou Kassai, Osaka, Japan
[73] Assignee: Aprica Kassai Kabushikikaisha, Osaka, Japan
[21] Appl. No.: 938,427
[22] Filed: Dec. 5, 1986
[30] Foreign Application Priority Data Dec. 9, 1985 [JP] Japan .................. 60-277739

[51] Int. Cl.⁴ .............................................. B62B 7/08
[52] U.S. Cl. .................................. 280/642; 280/658; 280/47.38
[58] Field of Search ............... 280/639, 642, 87.02 W, 280/643, 650, 658, 47.38, 289 WC, 647, 649; 297/16, 21, 29

[56] References Cited
U.S. PATENT DOCUMENTS
4,542,916  9/1985  Kassai ............................ 280/642

Primary Examiner—John J. Love
Assistant Examiner—Richard Camby
Attorney, Agent, or Firm—W. G. Fasse; D. H. Kane, Jr.

[57] ABSTRACT

A pushcart suitable for conveying a child's car seat, etc., auxiliarily used when a child is to be seated on the seat of an automobile or the like, the child's car seat being fixed on the seat of the automobile. The pushcart has a foldable car body portion, which is provided with a support block for placing the child's car seat thereon. The car body portion has components usually provided in a baby carriage, such as push rods, a pair of front legs, front wheels attached to the lower ends thereof, a pair of rear legs, and rear wheels attached to the lower ends thereof. If a child's car seat, for example, is placed on the pushcart, the pushcart can be used in a manner similar to that of a baby carriage.

12 Claims, 4 Drawing Figures

PUSHCART

BACKGROUND OF THE INVENTION

1. Field of the Invention

This invention relates to a pushcart adapted to convey a child's car seat or the like which is auxiliarily used by being fixed on the seat of an automobile when a baby or child is to be seated thereon, and particularly it relates to a foldable construction for such pushcarts.

2. Description of the Prior Art

When a baby or child is set on the seat of an automobile, it sometimes happens that the safety belt furnished to the automobile cannot be applied to the baby or child whose sitting height is small. When a baby or child is set on an adult's seat, it sometimes happens that the longitudinal dimension of the seat portion of said seat is too long for the baby or child to bend his knees or to set his feet on the floor, making it difficult to obtain a stabilized seated state.

In these cases, it has been common practice to mount a separately prepared child's car seat on such a seat and seat a baby or child thereon.

When going out with a baby or child in a car, one often loads the car with a baby carriage so that at the destination one may get the baby or child out of the car and set him in the baby carriage for conveyance.

Loading the car with a baby carriage in consideration of activities at the destination while attaching a child's car seat, as described above, causes inconvenience particularly when the car trunk is narrow as is the case with a small-sized car.

Thus, when attention is given to a child's car seat, it is seen that it has already been provided with an arrangement, which can serve as a satisfactory seat, including the seat portion, backrest portion and armrests, and strictly speaking, it could be used as a baby carriage simply by adding wheels thereto. If a pushcart for conveying such a child's car seat is prepared, therefore, it is possible to use the child's car seat as a baby carriage simply by placing it on the pushcart. It is also desirable that such a pushcart can be folded into compact form when it is unnecessary.

SUMMARY OF THE INVENTION

Accordingly, an object of this invention is to provide a pushcart which can be used in the manner described above and which can be folded into compact form when it is unnecessary.

A pushcart according to the invention comprises:

a pair of longitudinally extending upper rods, a pair of lower rods disposed below said upper rods and extending substantially parallel to said upper rods, a pair of front legs turnably connected to the respective front ends of said upper rods and the respective front ends of said lower rods and extending further downward from said lower rods, said front legs each having a front wheel, a pair of push rods turnably connected to the respective rear ends of said upper rods and the respective rear ends of said lower rods and extending upward from said upper rods, a grip rod connecting said pair of upper rods, a pair of rear legs connecting members turnably connected at one of their respective ends to said push rods, a pair of rear legs turnably connected to the other ends of said rear leg connecting members and adapted to abut at their upper end surfaces against the back surfaces of the push rods when the other ends of the rear leg connecting members are positioned relatively low with respect to their connecting portions associated with the push rods, said rear legs each having a rear wheel, a pair of rear leg connecting rods turnably connected at their front ends to portions in the vicinity of the connecting portions between said lower rods and said push rods and turnably connected at their rear ends to said rear legs, front and rear support blocks connecting said pair of front legs and said pair of rear legs in a plane defined between said pair of lower rods and said pair of rear leg connecting rods, and stop means for defining the terminal ends of the lower rods positioned forwardly of the upper rods so that the lower ends of the front legs are positioned forwardly of their upper ends and so that the lower ends of the push rods are positioned forwardly of their upper ends, in link mechanism in the form of parallelograms defined by said upper rods, said front legs, said lower rods and said push rod.

When the pushcart of this invention is folded, the upper end lower rods are turned upward with respect to the push rods to move the front legs toward the push rods while raising them until they are substantially parallel to the lower end portions of the push rods. On the other hand, the rear leg connecting members and the rear leg operative connecting rods are also turned upward with respect to the push rods, while moving the rear legs until they are substantially parallel to the lower end portions of the push rods. Thus, the pushcart can be folded in such a manner that with the center at each push rod which often has the greatest vertical dimension, and on each of the front and rear sides, the upper rod, lower rod and front leg, and the rear leg connecting member, rear leg operative connecting rod and rear leg are respectively received within the range of the height of the push rod. Therefore, the pushcart can be folded in the most compact form with the dimensions of the push rods maintained at a predetermined value.

Further, since the pushcart of the invention has front and rear support blocks, it can be used as a baby carriage with a seat simply by placing a child's car seat on said blocks. In addition, the pushcart of the invention can be used for conveying, besides a child's car seat, for example, a baby carrying bag, a portable bed or the like. It can also be used for conveying loads other than a baby or child.

DESCRIPTION OF THE PREFERRED EMBODIMENTS

Figure 1:
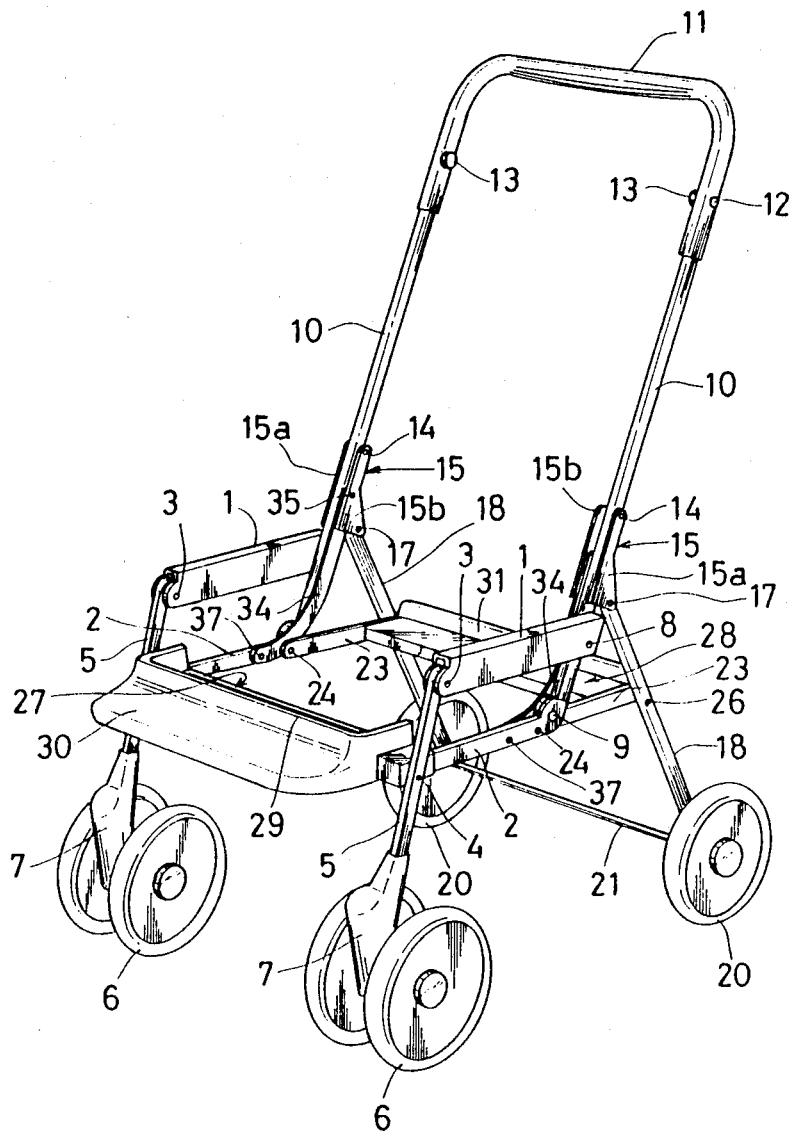
FIG. 1 is a perspective view showing the opened state of an embodiment of the invention.
Figure 2:
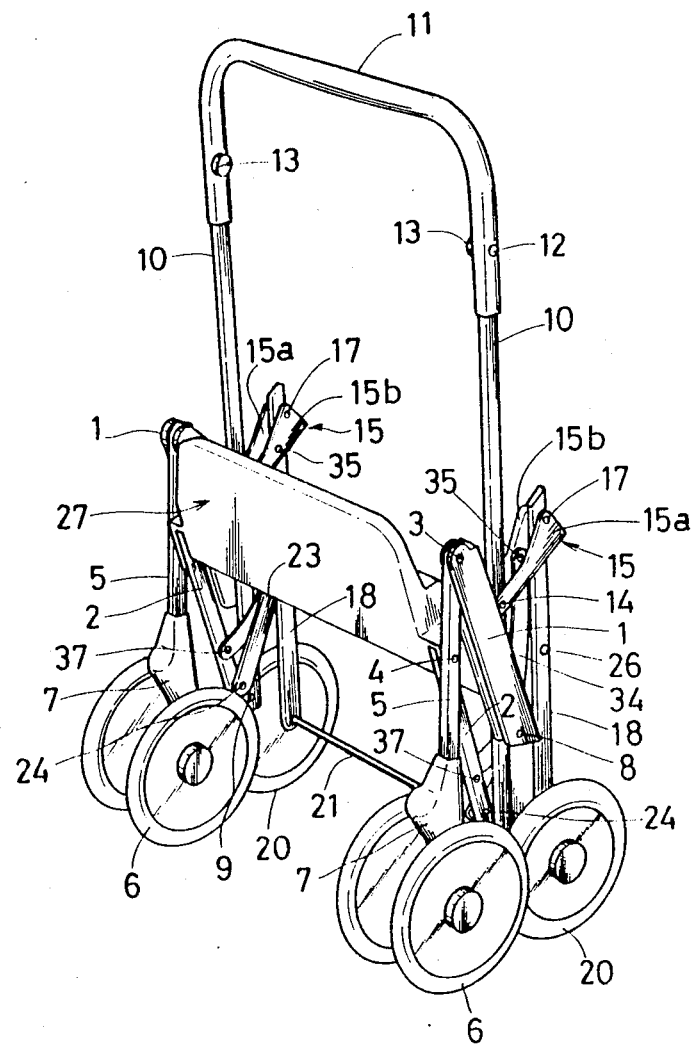
FIG. 2 is a perspective view showing the closed state of the pushcart of FIG. 1.
Figure 4:
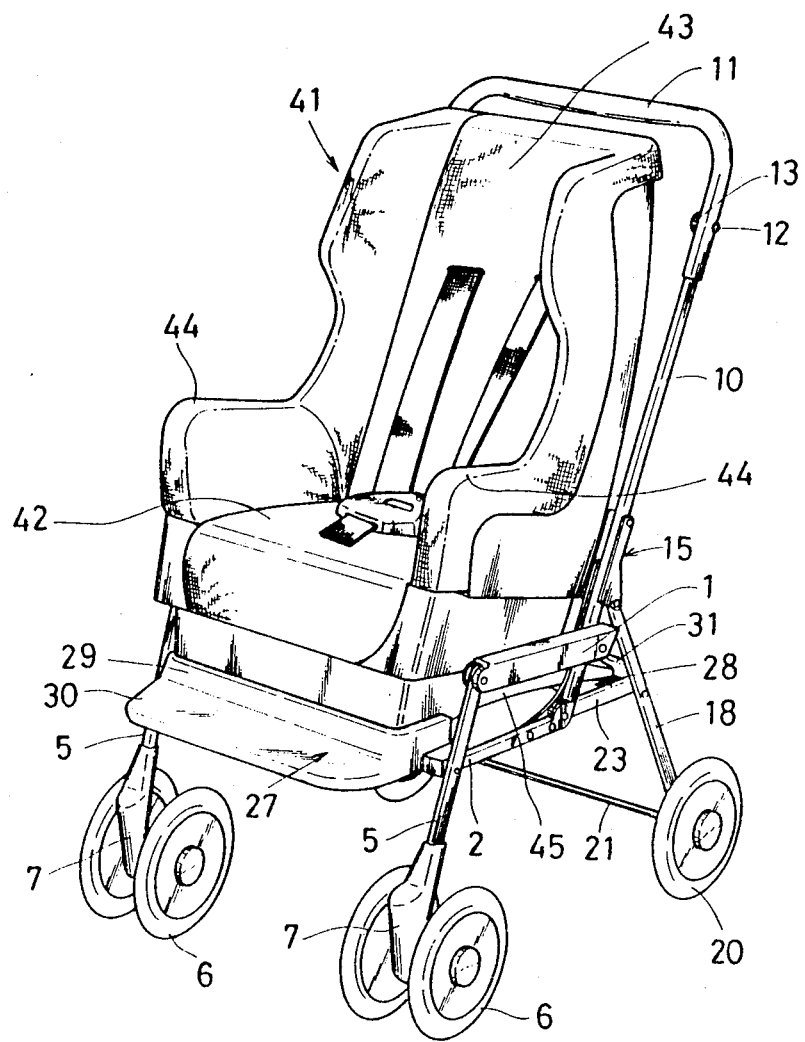
FIG. 4 is a perspective view showing a child's car seat placed on the pushcart of FIG. 1.

The accompanying drawings show an embodiment of the invention. FIG. 1 is a perspective view showing the opened state of the pushcart, and FIG. 2 is a perspective view showing the closed state. FIG. 2 is an enlarged perspective view of part of the pushcart shown in FIG. 1. FIG. 4 is a perspective view showing a child's car seat placed on the pushcart of FIG. 1.

When attention is given to both sides of substantially the middle of the pushcart shown in FIG. 1, it is seen that there are a pair of longitudinally extending upper rods 1. Disposed below each upper rod 1 is one of a pair of lower rods 2 extending parallel to the upper rod 1.

In addition to said pair of upper rods 1 and said pair of lower rods 2, there are other various components which are symmetrically positioned.

Each upper rod 1 has a pivot pin 3 positioned on the front end thereof, while each lower rod 2 has a pivot pin 4 positioned on the front end thereof. A pair of front legs 5 are turnably connected to the front ends of said upper and lower rods 1 and 2 by said pivot pins 3 and 4. The front leg 5 extends further downwardly from the lower rod 2 and has front wheels 6. Two front wheels 6 are provided for each front leg 5, and form a caster 7 when attached to the front leg 5.

Each upper rod 1 has a pivot pin 8 positioned on the rear end thereof, while each lower rod 2 has a pivot pin 9 positioned on the rear end thereof. A pair of push rods 10 are turnably connected to the rear ends of the upper rods 1 and the rear ends of the lower rods 2 by said pivot pins 8 and 9. Each push rod 10 extends further upwardly from each upper rod 1.

A grip rod 11 is provided for connecting the pair of push rods 10. The grip rod 11 is of inverted U-shape, with its ends fitted on the upper ends of the push rods 10. The grip rod 11 is formed of a pipe, with its ends receiving the upper ends of the push rods 10. Preferably, the ends of the push rods 11 are slidably received in the ends of the inverted U-shaped grip rod 11 and can be fixed at a plurality of positions therealong. In this arrangement, the height of the grip rod 11 can be adjusted. To this end, through not illustrated in detail, a combination of a bolt 12 extending through the grip rod 11 and push rod 10 and a thumb nut 13 is used, the push rod 10 being formed with a plurality of holes at different levels for receiving the bolt 12.

Figure 3:
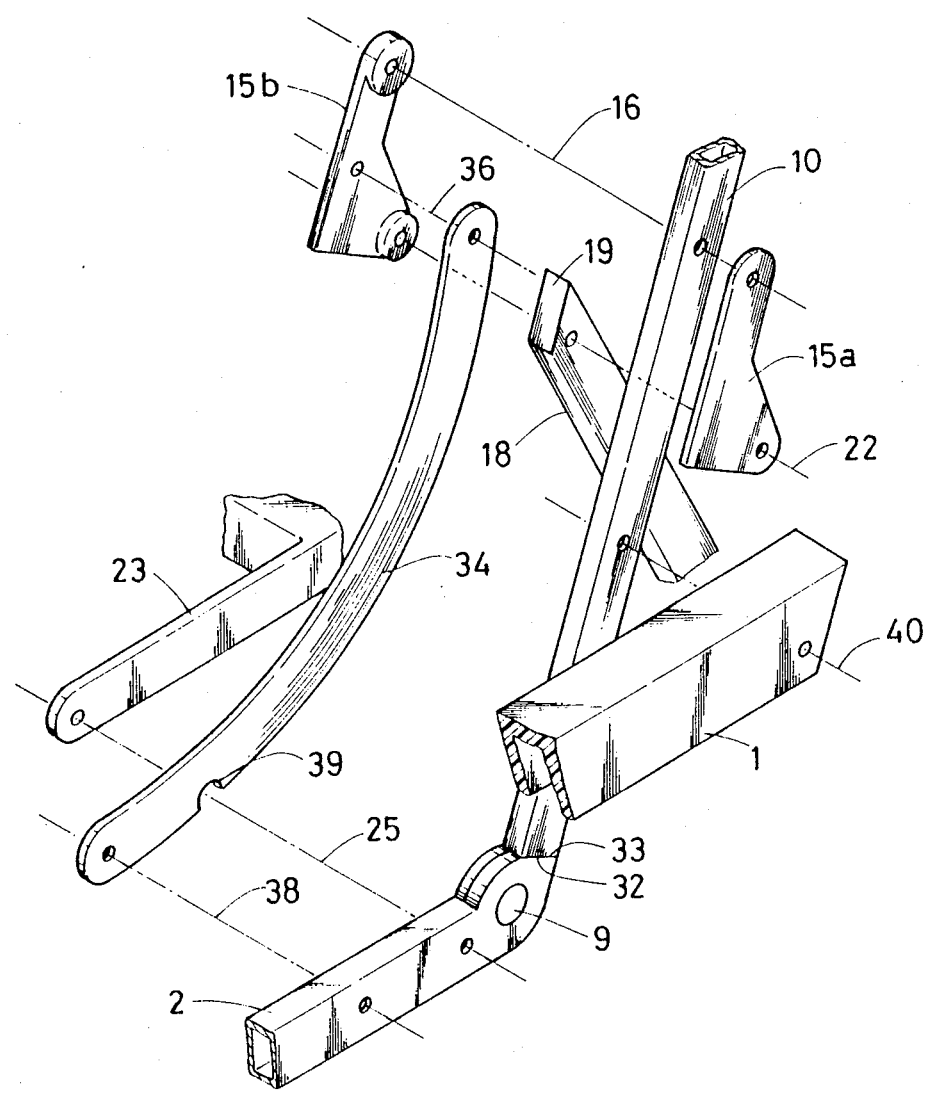
FIG. 3 is an enlarged exploded view of connecting portions related to an upper rod 1, lower rod 2, push rod 10, rear leg connecting member 15, rear leg 18, rear leg connecting rod 23 and diagonal rod 34 which are positioned on the right-hand side of FIG. 1.

A pair of rear leg connecting members 15 are turnably connected at one of their respective ends to the push rods 10 by pivot pins 14. Each rear leg connecting member 15, as shown in FIG. 3, is composed of a set of rear leg connecting plates 15a and 15b positioned with the push rod 10 interposed therebetween. In FIG. 3, a dash-dotted line 16 indicates the location where the pivot pin 14 extends.

Referring again to FIG. 1, the other end of each rear leg connecting member 15 is turnably connected to one of a pair of rear legs 18 by a pivot pin 17. The upper end 19 of each rear leg 18 (see FIG. 3) is adapted to abut against the back surface of the push rod 10 when the other end of rear leg connecting member 15, i.e., the end where the pivot pin 17 is installed, is positioned relatively low with respect to the connecting portion between the rear leg connecting member 15 and the push rod 14, i.e., the pivot pin 14. Further, each rear leg 18 has a wheel 20 mounted on the lower end thereof. A widthwise extending rod 21 is connected between the lower ends of the pair of rear legs 8 to extend through the rear wheels 20.

In addition, in FIG. 3, a dash-dotted line 22 indicates an axis through which the pivot pin 17 extends.

A pair of rear leg connecting rods 23 are connected at their front ends to portions in the vicinity of the connecting portions between the lower rods 2 and the push rods 10 by pivot pins 24. In FIG. 3, a dash-dotted line 25 indicates an axis through which the pivot pin 24 extends, and in this embodiment, the pivot pin 24 extends through the lower rod 2. However, such pivot pin 24 may be arranged to extend through the push rod 10. The rear end of the rear leg connecting rod 23 is turnably connected to the rear leg 18 by a pivot pin 26.

In a plane defined between the pair of lower rods 2 and the pair of rear leg operative connecting rods 23, there are installed a front support block 27 and a rear support block 28 which respectively connect the pair of front legs 5 and the pair of rear legs 18. In this embodiment, the front support block 27 is fixed to the pair of lower rods 2. Further, the front support block 27 is provided with a transverse weir 29. Formed forwardly of said weir 29 is a relatively wide surface 30 to serve at a footrest. On the other hand, the rear support block 28 is provided with a transverse weir 31. Further, the rear support block 28 is, in this embodiment, fixed to the pair of rear leg connecting rods 23.

Further, this pushcart is provided with stop means for fixing the opened state shown in FIG. 1. That is, there is stop means for defining the terminal end of the state in which the lower rod 2 is positioned forwardly of the upper rod 1 in a link mechanism defined by the upper rod 1, the front leg 5, the lower rod 2 and the push rod 10, so that the lower end of the front leg 5 is positioned forwardly of its upper end and so that the lower end of the push rod 10 is positioned forwardly of its upper end (see FIG. 1). In this embodiment, some form of stop means is employed.

A first form, as best shown in FIG. 3, comprises a pair of abutment surfaces 32 and 33 provided in relation to the connecting portion between the push rod 10 and the lower rod 2. The push rod 10 and the lower rod 2 are turnable relative to each other around the axis of the pivot pin 9; however, when the abutment surfaces 32 and 33 abut against each other, they define the terminal end of such turning movement. For example, the push rod 10 cannot turn further clockwise from the state of FIG. 3 relative to the lower rod 2 around the axis of the pivot pin 9.

In addition, substantially the same arrangement as that comprising the abutment surfaces 32 and 33 is employed in the connecting portion between the front leg 5 and the upper rod 1.

A second form of stop means is attained by a diagonal rod 34 shown enlarged in FIG. 3. The diagonal rod 34 is turnably connected at one end thereof to the rear leg connecting member 15, more specifically to the rear leg connecting plate 15b, by a pivot pin 35. In FIG. 3, a dash-dot line 36 indicates an axis through which such pivot pin 35 extends. The other end of the diagonal rod 34 is turnably connected to the lower rod 2 by a pivot pin 37. In addition, in FIG. 3, a dash-dot line 38 indicates an axis through which such pivot pin 37 extends. The lower side of the diagonal rod 34 is formed with a notch 39 to receive the pivot pin 24 extending through said dash-dotted line 25. That is, when the diagonal rod 34 receives the pivot pin 24 in its notch 39, it cannot turn further downward around the axis of the pivot pin 37. Therefore, the pivot pin 24 also functions as an abutment element capable of abutting against the lower side of the diagonal rod 34. In addition, such abutment element may be a member separate from the pivot pin 24, installed at the connecting portion between the push rod 10 and the lower rod 2.

In FIG. 3, a dash-dotted line 40 indicates an axis through which the aforesaid pivot pin 8 extends.

In the pushcart described above, the state shown in FIG. 1 is established in the following manner. The stop means including the abutment surfaces 32 and 33 and the stop means including the diagonal rod 34 inhibit the lower ends of the front legs 5 from turning further forward, while inhibiting the upper ends of the push rods 10 from turning further rearward. In this state, the link mechanism in the form of a parallelogram defined by the upper rod 1, the front leg 5, the lower rod 2 and the push rod 10 is made incapable of operation. The rear leg connecting rod 23 connected to the lower rod 2, which is one of the links of the parallelogram thus fixed, prevents the lower end of the rear leg 18 from turning further rearward. The upper end surface 19 (FIG. 3) of the rear leg 18 abuts against the back surface of the push rod 10 to exert a force which tends to turn the rear leg connecting member 15 counterclockwise around the axis of the pivot pin 14, such turning movement being prevented by the diagonal rod 3. Therefore, in the opened state shown in FIG. 1, the more load is applied to the pushcart, the more firmly is this opened state maintained.

Such pushcart will have, for example, a child's car seat 41 placed thereon, as shown in FIG. 4. This child's car seat 41, like the seat of an ordinary baby carriage, has a seat portion 42, a backrest portion 43 and a pair of armrests 44. The child's car seat also has a block 45 which will be used during normal use, i.e., when it is used as placed on the surface of the seat of an automobile. By the use of this block 45, the child's car seat is stably placed on the pushcart. That is, the block 45 is placed to cover both the front and rear support blocks 27 and 28, the longitudinal positioning thereof being determined by the front and rear weirs 28 and 31. The widthwise positioning can be attained by the opposite ends of the weir 29 and by the pair of upper rods 1. When such child's car seat 41 is placed on the pushcart, the broad surface 30 of the front support block 27 functions as a footrest for the child set on the child's car seat. The pushcart has been used to carry the child's car seat using the front and rear support blocks 27 and 28, but it may be also used to carry a baby carrying bag, a portable bed, or the like.

When attention is given to the grip rod 11 shown in FIGS. 4 and 1, it is seen that the grip rod 11 shown in FIG. 4 is lower than the one shown in FIG. 1. This is due to the height adjustment mechanism described previously. In addition, in the folded state of the pushcart to be described below, to make it more compact it is preferable that the grip rod 11 be set at the lowest position in its height adjustment range.

The opened state shown in FIG. 1 can be changed to the closed state shown in FIG. 2, for example, by raising the front ends of the upper rods 1 or the front support block 1 while turning the upper rods 1 and the lower rods 2 clockwise, as viewed in the figure, to move the front legs 5 toward the push rods 10. At this time, the rear leg connecting rods 23 act and auxiliarily the diagonal rods 34 also act, causing the rear legs to move toward the push rods 10 so that they are arranged behind said rear legs 18, while turning the rear leg connecting members 15 counterclockwise around the axes of the pivot pins 14. In response thereto, finally, the folded state shown in FIG. 2 is obtained. In FIG. 2, the front and rear legs 5 and 18 are within the range of the height of the push rods 10 while being substantially parallel to the push rods 10.

The front wheels 6 shown in FIG. 1 and the front wheels shown in FIG. 2 are shifted in direction by 180 degrees from each other by the action of casters. That is, the front wheels 6 are positioned relatively rearwardly of the front legs in FIG. 1, but in FIG. 2 they are positioned relatively forwardly of the front legs 5. Therefore, even in the state of FIG. 2, the wheel base between the front and rear wheels 6 and 20 is relatively large, so that the self-standing state shown in FIG. 2 can be attained more stably. However, when it is desired to achieve a more compactly folded state, the front wheel 6 can be positioned relatively rearwardly of the front legs 5 by utilizing the action of the casters. In that case, the rear wheels 20 and other parts will be advantageously received between the two front wheels 6 on each front leg 5.

In the illustrated embodiment described above, the stop means has been realized using, for example, the abutment surfaces 32, 33 or the diagonal rod 34; however, either one may be omitted. For example, the diagonal rod 34 may be omitted. Further, such stop means may be in the form of a latch or a foldable link adapted to fix one of the angles of a parallelogram linkage defined by the upper rod 1, the front leg 5, the lower rod 2 and the push rod 10.

Although the present invention has been described and illustrated in detail, it is clearly understood that the same is by way of illustration and example only and is not to be taken by way of limitation, the scope of the present invention being limited only by the terms of the appended claims.

What is claimed:

1. A push cart comprising a pair of longitudinally extending upper rods, a pair of lower rods disposed below said upper rods and extending substantially parallel to said upper rods, a pair of front legs turnably connected to the respective front ends of said upper rods and the respective front ends of said lower rods and extending further downwardly from said lower rods, said front legs each having a front wheel, a pair of push rods turnably connected to the respective rear ends of said upper rods and the respective rear ends of said lower rods and extending upwardly from said upper rods, a grip rod connecting said pair of upper rods, a pair of rear leg connecting members turnably connected at one of their respective ends to said push rods, a pair of rear legs turnably connected to the other ends of said rear leg connecting members and adapted to abut at their upper end surfaces against the back surfaces of said push rods when the other ends of the rear leg connecting members are positioned relatively low with respect to their connecting portions associated with the push rods, said rear legs each having a rear wheel, a pair of rear leg connecting rods turnably connected at their front ends to portions in the vicinity of the connecting portions between said lower rods and said push rods and turnably connected at their rear ends to said rear legs, front and rear support blocks connecting said pair of front legs and said pair of rear legs in a plane defined between said pair of lower rods and said pair of rear leg connecting rods, and stop means for defining the terminal ends of the lower rods positioned forwardly of the upper rods so that the lower ends of the front legs are positioned forwardly of their upper ends and so that the lower ends of the push rods are positioned forwardly of their upper ends to form a link mechanism as a parallelogram defined by said upper rods, said front legs, said lower rods and said push rods.

2. The pushcart as set forth in claim 1, wherein said grip rod is formed of an inverted U-shaped rod, with its ends fitted to the upper ends of said push rods.

3. The pushcart as set forth in claim 2, wherein the ends of said inverted U-shaped rod and the upper ends of the push rods are slidable to each other and fixable together at a plurality of positions.

4. The pushcart as set forth in claim 1, wherein the front ends of said rear leg connecting rods are turnably connected to said lower rods.

5. The pushcart as set forth in claim 1, wherein said front support block is fixed to said pair of lower rods.

6. The pushcart as set forth in claim 1, wherein said rear support block is fixed to said pair of rear leg connecting rods 7. The pushcart as set forth in claim 1, wherein said front support block has a transversely extending weir.

8. The pushcart as set forth in claim 7, wherein said front support block defines a surface located forwardly of said weir to serve as a footrest.

9. The pushcart as set forth in claim 1, wherein said rear support block has a transversely extending weir.

10. The pushcart as set forth in claim 1, wherein said stop means includes a pair of abutment surfaces which are respectively installed in the connecting portion between said front leg and said upper rod and in the connecting portion between said push rod and said lower rod.

11. The pushcart as set forth in claim 1, wherein said stop means includes a combination of a diagonal rod operatively connected between said rear leg connecting member and said lower rod, and an abutment piece which is installed in the vicinity of the connecting portion between said push rod and said lower rod and which is capable of abutting against the lower side of said diagonal rod.

12. The pushcart as set forth in claim 11, wherein said abutment piece serves also as a pivot pin which forms the connecting portion between said lower rod and said rear leg connecting rod.

* * * * *